Patented June 30, 1936

2,046,265

UNITED STATES PATENT OFFICE 2,046,265

APPARATUS FOR REGENERATING ZEOLITE BEDS

Joseph H. Hewetson, Cincinnati, Ohio, assignor to J. H. Hewetson Company, a corporation of Ohio Application January 31, 1935, Serial No. 4,366

2 Claims. (Cl. 210—24)

This invention relates to a method and apparatus for regenerating beds of artificial or natural zeolites such as are used for water softening.

More particularly the object of the invention is to reduce the amount of service water required to regenerate such beds. In many localities water can be obtained only at high cost and in cases where the water supply being treated is of a high hardness, the service water used in regeneration amounts to a very considerable percentage of the quantity treated and thus decreases the desirability of this type of apparatus.

Zeolite water softeners are of two types, those in which the water to be softened flows upward through a zeolite bed and those in which the water flows downward. Since the latter is the usual type, my method will be described as practiced upon it. Any person skilled in the art can adapt it to the other type.

In a down-flow softener, the ordinary regenerating cycle consists of three steps:

1.—Backwashing the bed by causing clean water to flow upward through it at a rapid rate, thus removing the products of mechanical filtration and at the same time loosening and separating from each other the original particles of the zeolite bed in preparation for the next step.

2.—Introduction, by means provided within the apparatus, of the regenerating charge (sodium chloride) from a solution tank where it is previously prepared in dissolved condition, and then allowing said solution to percolate through the bed, or forcing it through and then allowing the bed to drain.

3.—Rinsing the solution (preferably downward) by means of clean fresh water.

In my improved method, the steps are as follows:

1.—The first step or backwash is performed just as above indicated except with water which has been reclaimed from the third step.

2.—Identical with ordinary process step 2.

3.—The rinse water, either all of it or a portion, is deflected from waste and conducted to a tank or reservoir where it is held in storage and used for backwashing in step 1 of the next regenerating cycle.

In the accompanying drawings—

Figure 1:
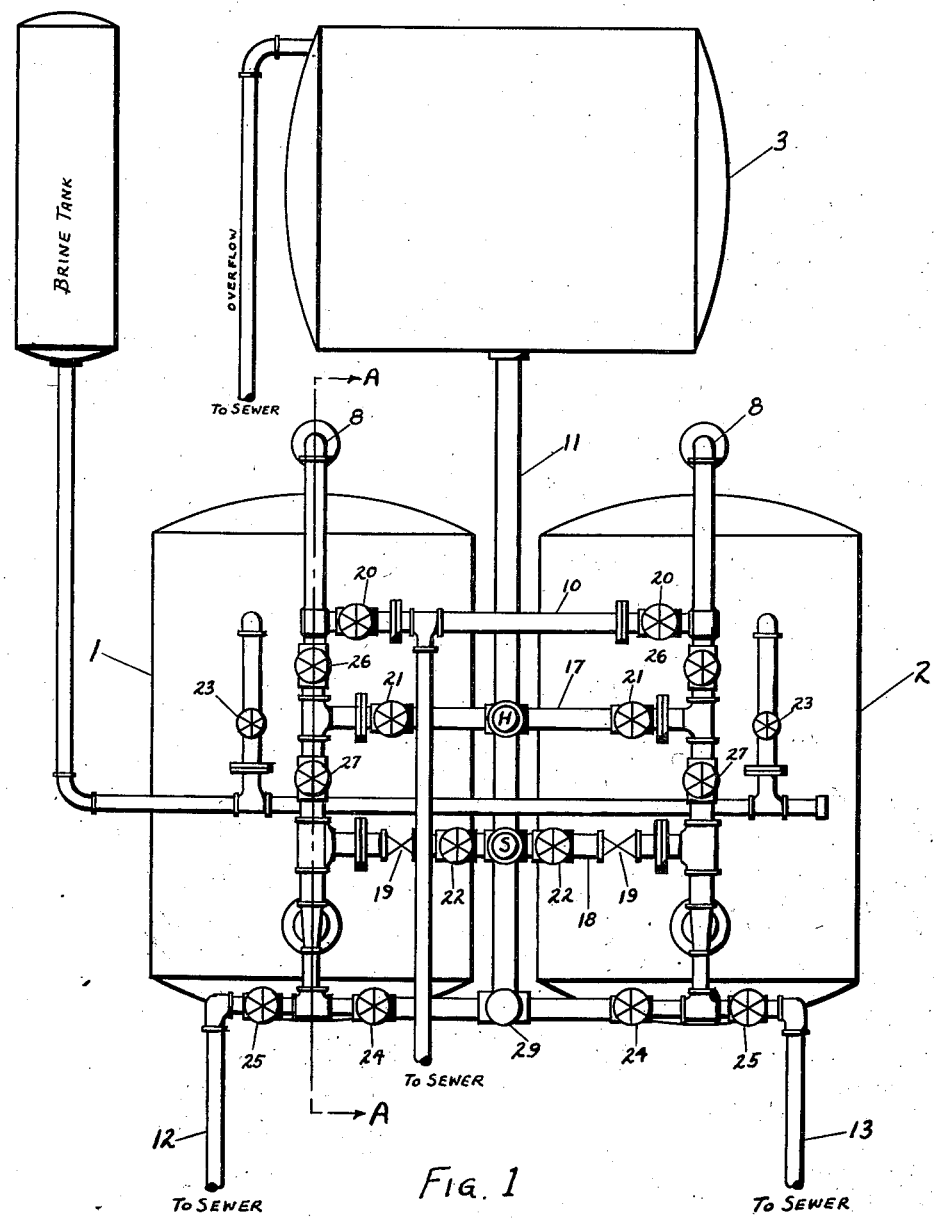
Fig. 1 is a front elevation of a two-cell (or two softener-tank) apparatus for carrying out my invention.

In the drawings 1 and 2 respectively, are the left and right operating tanks or cells of a water softener. 3 is a storage tank for rinse water, while 4 is a brine tank. Within cells 1 and 2 there is in each a water space 5 at the top, a zeolite bed 6 in the middle and a graded gravel bed 7 at the bottom.

Hard water is supplied to the cells through the pipes 8 from the point H; fresh brine through pipe 9. Soft water flows from the softener at point S. Pipe 10 delivers waste water from backwashing to the sewer. Pipe 11 delivers reclaimed rinse water upward to storage tank 3 and water for backwashing downward from said storage tank. Pipe ends 12 and 13 are also used for delivery of waste water to the sewer.

Figure 2:
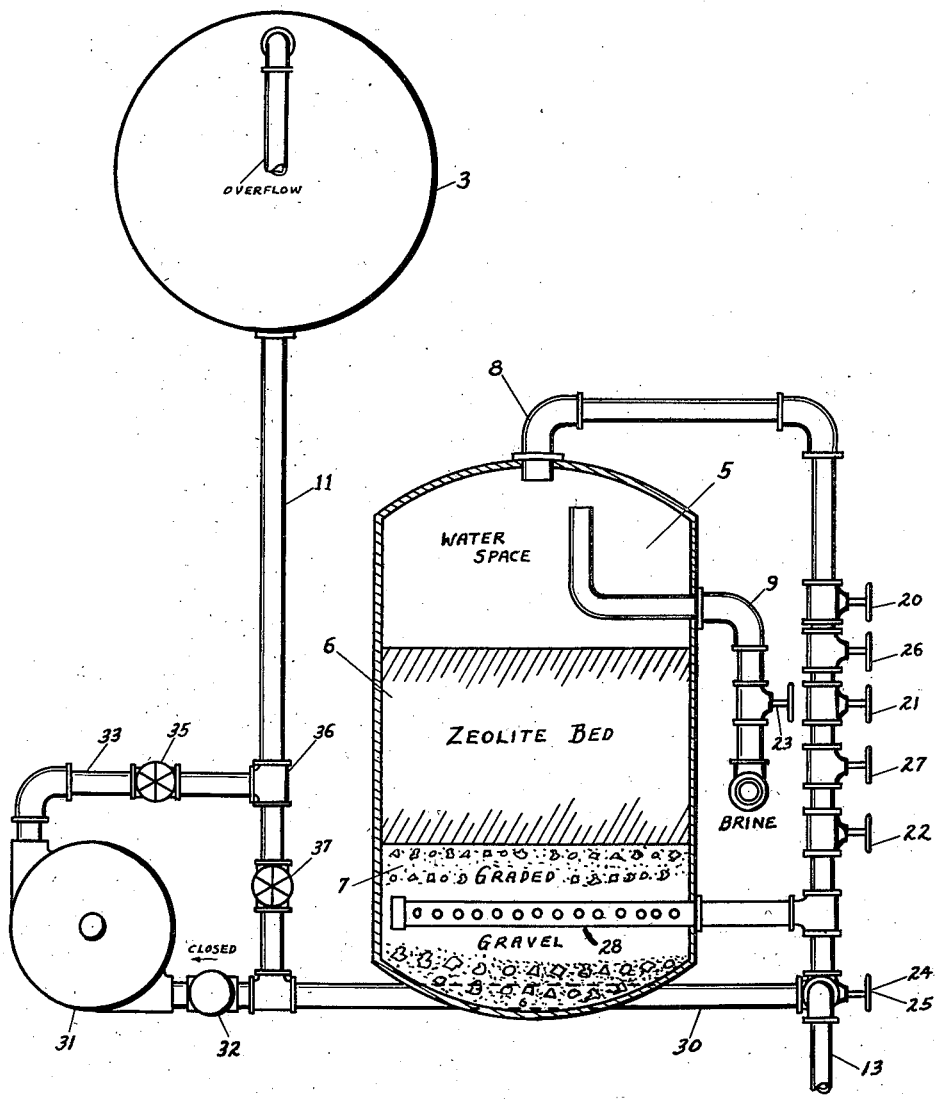
Fig. 2 is a side elevation in section along the line A—A of Fig. 1 showing the interior arrangements of a softener cell and a side view of the pumping arrangements.

As will be observed from Fig. 2, the brine supply pipe 9 is entirely independent of other piping about the softener and is brought under the other piping although such arrangement is not essential.

The brine pipe 9 extends upwardly into the water space 5 and carries a valve 23. The hard water pipe 8 likewise enters the space 5 but projects downward. In the hard water pipe 8 there are the valves 26 and 27, while in the back wash waste pipe 10 there are two valves 20. In the soft water pipe 18 which joins the hard water pipes 8 which serve each cell, there are meters 19, one for each cell. In the hard water cross pipe 17 which joins the vertical pipes 8 on each cell respectively, there are two valves 21 and a T H which is the inlet for hard water under pressure. In the pipe 19 there is a corresponding T S which is the outlet for soft water.

Joining waste pipes 12 and 13, there is a pipe 34 in which there is a pair of valves 25 outside of the points where the vertical pipe 8 joins it. Pipe 34 also bears a pair of valves 24 within the aforesaid points. At the middle point in pipe 34 there is a T 29 from which a pipe 30 runs between the cells to a pump 31 just before which there is a check valve 32. Pipe 11 from tank 3 makes a junction with pipe 30 immediately in front of the check valve.

33 is the discharge pipe for pump 31 and bears a valve 35 just before the point 36 at which it connects with pipe 11. Between point 36 and the point at which pipe 11 joins pipe 30, there is a valve 37.

The valve settings for the various operations of the cycle are then as follows:

When the plant is producing soft water, valves 21, 26 and 22 are open and all others are closed. Hard water is therefore delivered to the cell through pipe 8 into the water space 5. Hard water percolates through the zeolite bed 6, thereby becoming soft, and thence through the graded gravel bed 7 into the perforated collector pipe 28 to soft-water delivery pipe 18 thence out through the T S.

If the backwashing operation were to be conducted according to standard practice, the settings would be as follows:—Valves 21, 27 and 20 would be open, and all others closed. Waste water from the backwash would flow through pipe 10 to the sewer.

In my improved method valves 27, 21 and 20 are open; all others are closed. Hard water then flows through pipe 17 and valves 21 into pipe 8 and downward through valves 27 and into perforated pipe 28. It then rises through the softener cell removing mechanically filtered particles from the beds of gravel and zeolite and then makes its exit from the top of the cell through pipe 8. Thence it goes through valve 20 and out pipe 10 to the sewer.

The steps described in the preceding paragraph are those which take place the first time the softener is backwashed. On the subsequent occasions, water which has been stored in tank 3 is used, at which time the valve settings are:—

Valve 35 is opened by hand and valve 37 is closed, check valve 32 is automatically open. Pump 31 is then started drawing stored rinse water out of tank 3 into pipes 11, 33, 30 and 34. Valves 24 and 25 are closed in this pipe so the water must pass into perforated pipe 28. From this point onward the same operations and settings are used as previously described.

It will be noted that in my construction the pump 31 is not used to force water up into tank 3 because the ordinary pressure of the hard water supply system is sufficient to accomplish this. The pump is necessary to get the water down however unless the pressure of the hard water supply system is so great that the tank 3 can be elevated to a considerable height, say 30 feet above the zeolite bed.

After the backwashing step has been completed and its particle laden waters rejected, treatment with concentrated sodium chloride solution is necessary. This reagent is derived from the elevated brine storage tank shown in Fig. 1 which is connected to pipe 9. To introduce the brine, valves 23 and 25 are opened and all others closed. The brine therefore flows downward through the zeolite and gravel beds, through perforated pipes 28 and down waste pipes 13 and 14 to the sewer.

As ordinarily conducted, the rinsing operation takes place according to accepted practice, with valves 21, 26 and 25 open and all others closed. This results in the discharge of water to the sewer through pipes 12 and 13. According to my improved process I leave valves 21, 26 and 24 open and close all others. Hard water then first traverses pipes 17 and valve 21 then goes through pipe 8 to the top of the cell, thence downward through the beds and into pipes 28, 30 and 11 into tank 3 where it is preserved for the next backwashing operation.

In case tank 3 is high enough to furnish satisfactory pressure for backwashing, I may by-pass the pump by closing valve 35 and opening valve 37 in which case water from tank 3 can enter the softener cells without going through the pump 31.

It is to be understood that a pump or pumps may be inserted in the pipe line 30 at any desired point or points.

I claim as my invention:

1. A water softener comprising a cell, a zeolite bed within said cell, means for backwashing said bed, said means comprising a storage tank, a brine tank, piping for bringing brine to said zeolite bed, piping for washing said zeolite bed with fresh water to remove said brine, piping for transferring the spent water for rinsing to said storage tank, a pump in said latter piping adapted to force said spent rinse water through said zeolite bed to backwash the latter.

2. A water softener according to claim 1 having in addition by-pass piping around the pump to enable the zeolite bed to be backwashed by force of gravity.

JOSEPH H. HEWETSON.